Figure 1:
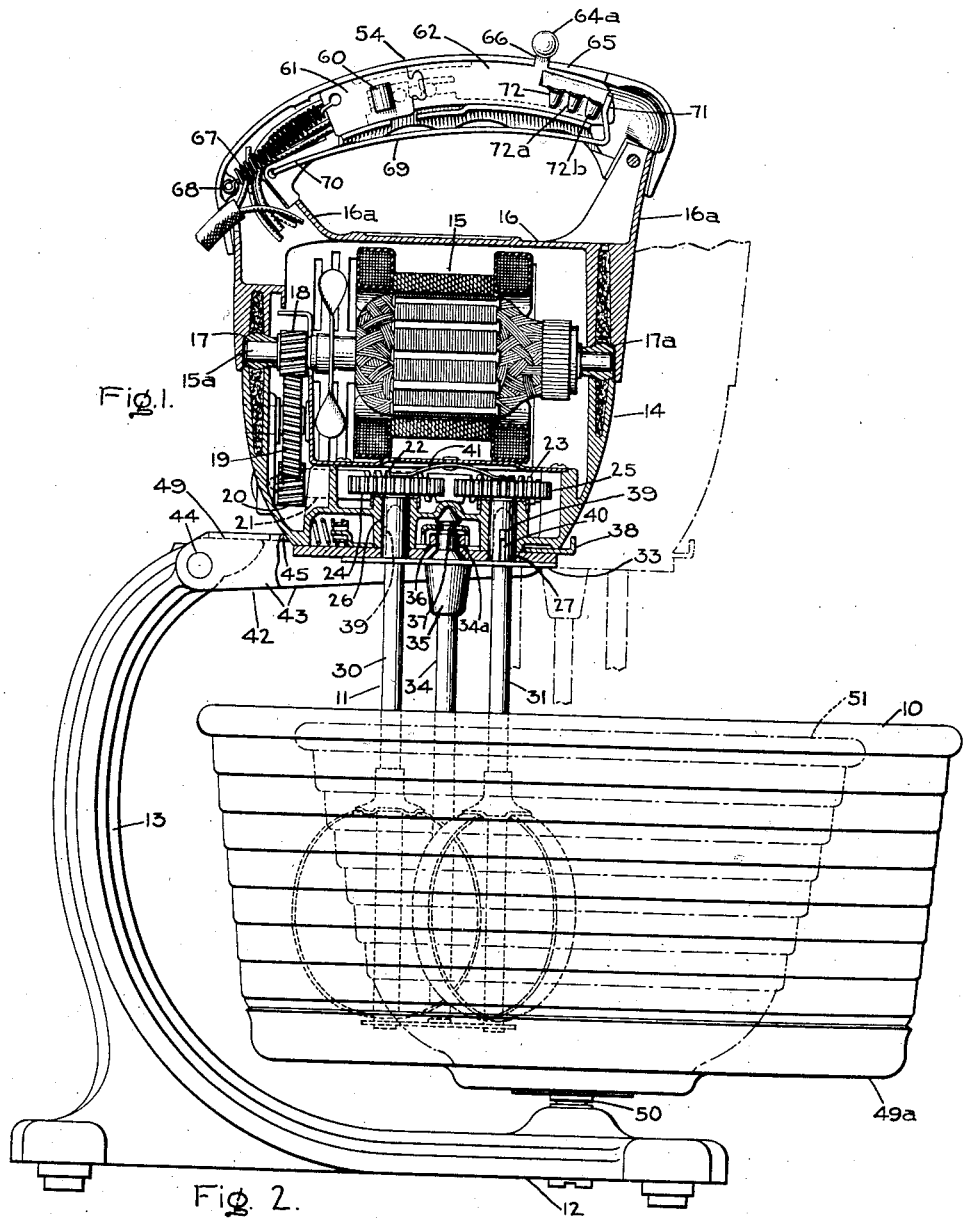

Dec. 28, 1937.　　　W. VAN GUILDER　　　2,103,922
MIXING DEVICE
Filed Sept. 19, 1935　　　2 Sheets-Sheet 1

Inventor:
Walter Van Guilder,
by Harry E. Dunham
His Attorney.

Dec. 28, 1937.   W. VAN GUILDER   2,103,922
MIXING DEVICE
Filed Sept. 19, 1935   2 Sheets-Sheet 2
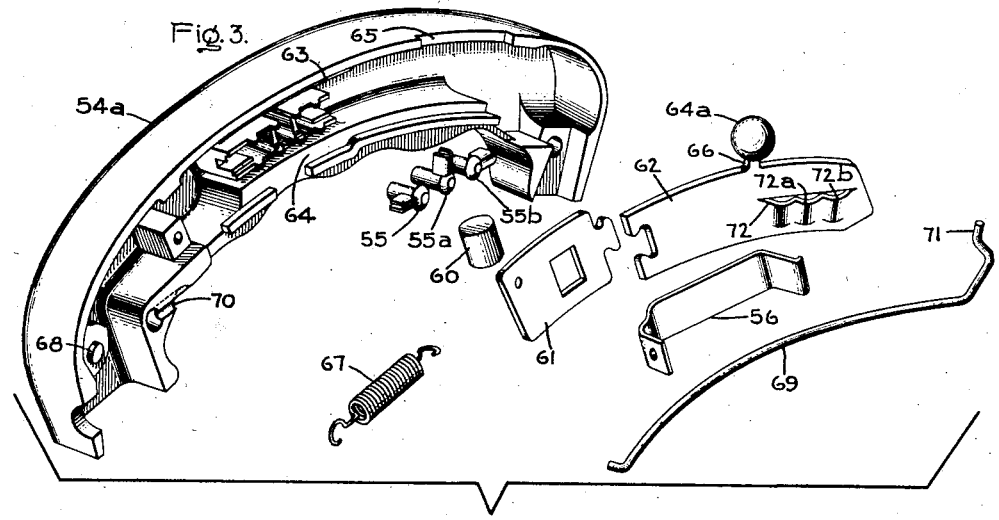
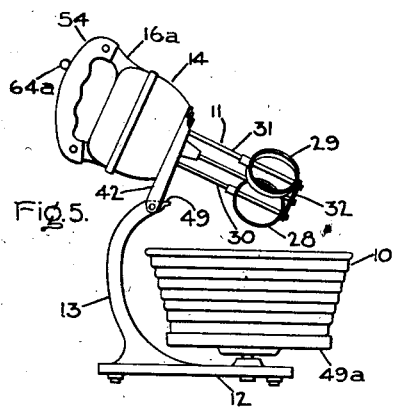
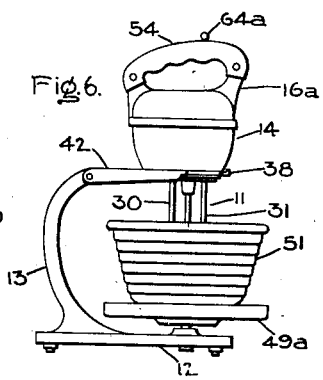
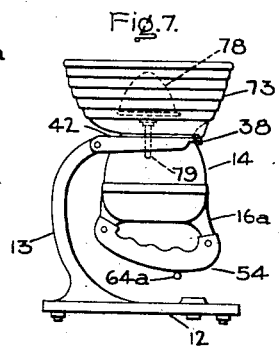
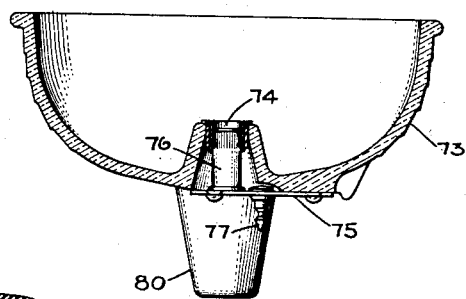
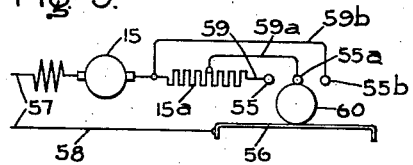
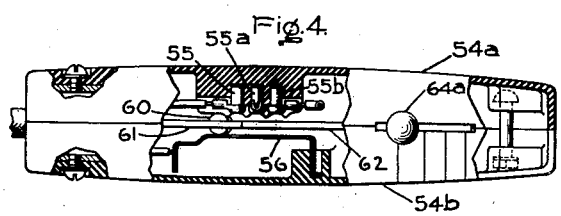
Inventor:
Walter Van Guilder,
by Harry E. Dunham
His Attorney.

Patented Dec. 28, 1937

2,103,922

UNITED STATES PATENT OFFICE 2,103,922

MIXING DEVICE

Walter Van Guilder, Oak Park, Ill., assignor to General Electric Company, a corporation of New York Application September 19, 1935, Serial No. 41,248

8 Claims. (Cl. 259—84)

This invention relates to mixing devices, more particularly to power driven devices for mixing batters, beating eggs, whipping cream, extracting juice, etc., and it has for its object the provision of an improved device of this character.

More specifically, this invention relates to a mixing device that is provided with a supporting base, or standard, but which can be removed from the base for operation in other locations, such as in a utensil that is being used on a range.

This invention, in one of its aspects contemplates the provision of an improved mixing device of this character, which is provided with suitable means for automatically stopping the motor in the event the mixer be dropped accidentally when the mixer is being used as a portable device removed from its base, and which is arranged so that when used as a portable device, the motor can be stopped almost instantly in the event the beaters become caught in the hand or clothing of the attendant.

This invention further contemplates the provision of improved means for mounting the motor on its base, and in addition, the provision of improved apparatus for extracting juice, etc.

In accordance with this invention, a suitable combination motor and beater unit is provided. A standard is provided for the motor-beater unit for supporting the unit in an operating position so that the beater element will depend from the unit for operation in a suitable receptacle also carried by the base. An improved attaching means is provided between the motor-beater unit and the standard, whereby the unit can be quickly and conveniently applied to and removed from the standard.

The attaching means is so arranged that the unit can be removed from its normal operating position and applied to the standard in a reverse position, whereby power can be taken off of the top of the unit for driving a juice extracting device and the like.

A handle is attached to the unit whereby it can be conveniently manipulated when removed from the standard. Arranged within the handle is a suitable switch for controlling the energization of the motor and also for controlling its speed. A latch is provided for locking the switch in each of its speed controlling positions when the motor is positioned on its standard. The latch, however, has an operating portion which is so positioned relative to the handle that when the handle is gripped by the operator, in supporting the unit when removed from the standard, it will be automatically moved to a releasing position.

A suitable spring is applied to the switch controlling member so that when the member is thus released, the switch is automatically returned to its off position unless it is manually held in a speed controlling position by the operator. Thus, when the operator is using the mixing device as a portable unit removed from the standard, it is necessary to manually hold the switch in its speed controlling position. Consequently, in the event the mixing device be dropped, the motor will be automatically stopped, or if the beater becomes caught in the hand or clothing of the attendant, the motor can be stopped instantaneously merely by releasing the switch.

Figure 2:
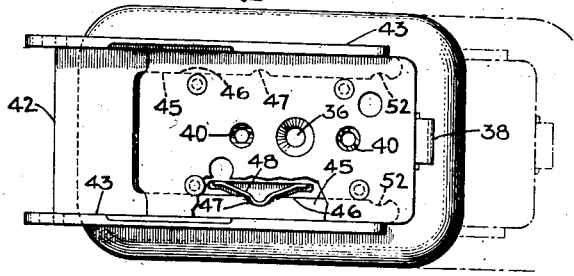

For a more complete understanding of this invention, reference should be had to the accompanying drawings in which Fig. 1 is a vertical side elevation of a mixing device embodying this invention, portions being broken away and portions being shown in section so as to illustrate certain details of construction; Fig. 2 is a bottom plan view of the motor and beater unit used in the mixing device of Fig. 1; Fig. 3 is an expanded perspective view illustrating the handle for the motor and beater unit, together with the controlling switch for the motor, and its latching means; Fig. 4 is a plan view of the handle, portions being broken away so as to illustrate certain details of construction; Figs. 5, 6 and 7 are views in side elevation illustrating the mixing device of Fig. 1 in different operative conditions; Fig. 8 is an elevation of a juice extracting device used with the mixing device of this invention; and Fig. 9 is a diagrammatic view illustrating the speed control system provided for the driving motor of the mixing device.

Referring to the drawings, this invention is shown as applied to a mixing device comprising a food receptacle 10 in which a suitable agitator or beater element 11 is arranged to operate. The receptacle 10 and the agitator 11 are mounted on a suitable frame, which comprises a base 12 on which an upright standard 13 is mounted at one end thereof, the left-hand end, as viewed in Figs. 1 and 5–7. The standard 13 preferably will be, and as shown is formed integrally with the base 12.

The agitator or beater element 11 is driven by a combination motor and gear reduction unit 14. The unit 14 comprises an electric driving motor 15 mounted within a housing 16. Preferably, the motor will be so arranged that it will be supported in a horizontal position, that is, so that its driving shaft 15a is supported in a horizontal position when the motor is in its working position on the base 12, as shown in Fig. 1. The opposite ends of the motor shaft 15a are supported in bearings 17 and 17a provided in the motor casing 16.

Mounted on one end of the motor shaft, the left-hand end, as viewed in Fig. 1, is a suitable gear 18 which meshes with an idler gear 19 supported in the casing. The gear 19 in turn meshes with a gear 20 which is mounted on one end of a worm shaft 21. The worm shaft 21 is provided with oppositely wound threads 22 and 23 which mesh with gears 24 and 25 respectively mounted on the upper ends of suitable vertically arranged driving shafts 26 and 27 respectively.

As shown, the agitator unit 11 is arranged to be suspended from the motor and gear unit in a substantially vertical position. The beater unit comprises a pair of beaters 28 and 29 (Fig. 5) mounted on suitable shafts 30 and 31. The beaters at their lower ends are rotatably mounted on a plate 32, while the upper ends of the shafts 30 and 31 are rotatably supported in a plate 33 (Fig. 1). The plate 33 is rigidly secured to a supporting rod 34, which, as shown, is provided at its upper end with an abutment 35 on which the plate 33 rests and to which it is secured. The lower end of the rod 34 is curved outwardly to provide for the rotary motion of the beaters.

The rod 34 is arranged to be rigidly secured to the motor unit, and for this purpose the upper end 34a of the rod above the plate 33 is arranged to be received in a suitable aperture 36 provided for it in the bottom wall of the housing 16. This upper end of the rod 34 is provided with an annular groove 37 which is arranged to receive a latching or locking device 38, whereby the agitator is secured in its vertical operating position. The beater unit and its latching device have substantially the same construction as the corresponding elements shown and described in the United States Patent No. 2,054,666, issued on September 15, 1936 to me. The beater rods 30 and 31 are provided with teeth 39 received in recesses 40 in the driving shafts 26 and 27, whereby driving connections are provided between the shafts and rods.

The driving shafts 26 and 27 are arranged in substantially the same fashion as the corresponding shafts in the above-mentioned patent. Thus, in the event the beater unit is applied to the casing and the teeth 39 provided on the beater rods 30 and 31 do not align with the notches 40 provided for them in the driving shafts, the shafts will be moved upwardly against the force of a suitable spring 41, and when the correct angular relation has been established between the beater shafts and their driving shafts, the driving shafts will be returned automatically to their positions shown in Fig. 1.

Suitable means are provided for mounting the power unit on the base so that it can be conveniently applied thereto and removed therefrom, but when it is applied to have a relatively rigid connection with the base so as to obviate any possibility of the unit becoming detached accidentally while it is being operated. The power unit is mounted on a supporting plate-like member 42, which is pivotally mounted on the upper end of the standard 13. As shown, the plate 42 is provided at its sides with depending flanges 43 which are pivotally mounted upon pins 44 that are secured to the opposite sides of the upper end of the standard 13. The flanges 43 at the sides project outwardly from the front of the plate and on their upper edges are provided with inturned flanges 45 arranged at right angles to the depending portions. The flanges 45 are arranged to slidably receive the power unit.

For this purpose, the motor housing 16 is provided in its lower wall with a pair of channels 46 arranged on opposite sides of the motor housing spaced apart so that they are slidably received by the inturned flanges 45 on the supporting table 42. In other words, the supporting table 42 is provided with a pair of laterally spaced apart flanges which receive a pair of laterally spaced apart channels on the power unit. In order to apply the power unit to the supporting plate, it is merely necessary to elevate the plate, as shown in Fig. 5, then slide the motor unit inwardly on the flanges 45. The flanges 45 are provided intermediate their ends with a pair of detents 47 which are arranged to receive resilient latching member 48 mounted in the gear housing and arranged to project into the channels 46 so as to be received in the notches 47 when the power unit is in its proper operating position on the table.

It will be noted that the upper end of the standard 13 is provided with a plain horizontal surface 49 in front of the axis of rotation of the plate, which serves to engage the plate to hold it in a horizontal operating position, as shown in Figs. 1, 6 and 7.

Thus, when the motor unit is mounted on the standard 13 in the manner just described, it will support the beater unit 11 in correct relation with reference to the bowl 10. The bowl 10, it will be observed, is mounted upon a suitable turntable 49a which rotates on a suitable spindle 50 mounted in the base 12. This turn-table 49a also functions to support a smaller bowl 51, shown in Fig. 6, and in dotted lines in Fig. 1. When the smaller bowl 51 is used, the motor power unit is moved laterally outwardly on the table to such a position that it will bring the beater unit 11 into substantially the same relation with the side walls of the smaller bowl as it did in the case of the larger bowl. The power unit is shown in this second position in Fig. 6 and in dotted lines in Fig. 1. In order to secure the motor unit in this second position, a second pair of notches 52 are provided in the flanges 45 to receive the resilient member 48.

In order that the power unit may be conveniently manipulated when removed from its supporting standard, a suitable handle 54 is provided which is attached to the power unit above it, and which, as shown, extends longitudinally over the casing 16 from the front to the rear thereof. The casing is provided with upright standards 16a at the front and rear which support the handle 54.

Arranged within the handle 54 is suitable switching means for controlling the energization and speed of the motor 15. To provide for the assembly of the switch, and the support of its various elements in proper relation with reference to each other, the handle 54 is divided into halves 54a and 54b. Within the portion 54a there are supported three fixed contacts 55, 55a and 55b spaced at intervals, as shown in Figs. 3 and 4. Directly opposite these three contacts is a relatively elongated fixed contact 56 which is supported in the mating handle member 54b. These contacts 55, 55a and 55b and the contact 56 are shown diagrammatically in Fig. 9. These contacts function to control the energization of the motor 15, which may be in any suitable electric motor, but preferably will be an electric motor adopted to operate on either alternating current or direct current. A suitable source of electrical supply 57 is shown diagrammatically in Fig. 9. It will be observed that a conductor 58 connects the contact 56 with one side of the supply source. Conductors 59, 59a and 59b connect the fixed contacts 55, 55a and 55b with the field winding 15a of the motor, the conductor 59 connecting the contact 55 with one end of the field, the conductor 59a connecting the contact 55a with a point intermediate the ends of the fields, while the conductor 59b connects the contact 55b with the inner end of the field, as shown diagrammatically in Fig. 9.

A suitable bridging contact 60 is arranged to successively connect the contacts 55, 55a and 55b with the contact 56 and thereby provide varied field strengths for the motor 15.

The contact 60 is of cylindrical form and is carried in an insulating slide member 61, which in turn is mechanically connected to a metallic operating slide member 62. In the switch assembly, it will be understood that the members 61 and 62 are rigidly secured together and slide as a single unit. The mating handle members 54a and 54b provide upper and lower channels 63 and 64 for the slide member 61, 62. This slide member is provided with a handle operating knob 64a accessible on the exterior of the handle 54, the handle being provided with an elongated slot 65 to provide for the movement of the neck 66 connecting the knob 64a with the slide.

It will be observed that when the slide is moved from its off position shown in Fig. 1 toward the right, it will cause the bridging contact member 60 to successively connect the three contacts 55, 55a and 55b with the contact 56 and thereby operate the motor at varying field strengths. For example, when the slide member completes the motor circuit from the contact 55 to the contact 56, the motor will be operating on maximum field strength and, therefore, at minimum speed; when the bridging contact 60 closes the circuit between the contacts 55a and 56, the motor will be operating on intermediate field strength and, therefore, at intermediate speed; and when the bridging contact 60 closes the circuit through the contact 55b and the contact 56, the motor will be operating on minimum field strength, and, therefore, at its maximum speed.

The slide member 61, 62 is biased to the off position, shown in Fig. 1, by means of a tension spring 67 which has one end anchored to a stud 68 and has its other end connected to the slide. Suitable means are provided for latching the slide member in each of its speed controlling positions against the force of the spring. This means comprises a suitable resilient latch 69 which has one end anchored in the handle 54. For this purpose, the mating handle members 54a and 54b are provided with semi-circular recesses 70 which when the handles are assembled form an aperture in which the left-hand end of the latch is rigidly anchored. The opposite end of the latching member 69 is provided with a latching portion 71 which is arranged to engage a series of projections or abutments provided on the slide member. As shown, three abutments 72, 72a and 72b are provided on the slide member. It is contemplated that the latching member 71 will bear against the left-hand side of the abutment 72 to hold the bridging contact 60 in a position to bridge the contact 55b and the contact 56; that it will rest between the abutments 72 and 72a to hold the slide 62 in its intermediate speed position wherein the contact 55a is connected with the contact 56; and that it will rest between the abutments 72a and 72b to hold the slide member 62 in its low speed position wherein the contact 55 is connected with the contact 56. Thus, when the motor power unit is supported on its standard and the knob 64a is moved to any of the speed controlling positions, the latching member 71 will engage the abutment 72, 72a, 72b to hold the slide in the respective speed controlling position.

The main portion of the latching member 69 between its end anchored in the channel 70 and its free end carrying the latch 71 is exposed on the exterior of the handle beneath it, as clearly shown in Fig. 1. This portion is so located and arranged that when the operator grasps the handle 54, in supporting the power unit when it is removed from the standard, the attendant will automatically elevate the portion 69 and therefore elevate the latch 71. When the latch 71 is thus elevated, it is moved above the projections 72, 72a and 72b, and, therefore, can effect no locking action whatsoever on the slide 61, 62. In other words, when the attendant uses the combination power and beater unit 14 as a portable device away from the standard, it is necessary to manually hold the slide 61, 62 in its respective speed controlling position by applying a finger or thumb to the knob 64a. The purpose of thus releasing the latch when the power unit is used as a portable device is that if the unit be accidentally dropped, the switch will be instantaneously opened to stop the motor by means of the spring 67, or should the beater 11 accidentally engage the clothing of the operator or the operator's hand, or a spoon, etc., the operator may instantaneously stop the motor merely by releasing the knob 64a.

In order to use the power unit to drive an auxiliary device, it is contemplated that the motor unit will be reversed in its operating position on the standard, that is, will be operated in an inverted position so that the driving shafts 26 and 27 are supported at the top of the power unit. For this purpose, it is merely necessary to reverse the position of the motor, and to slide it on the supporting table 42, as previously described only in an inverted position. The power unit is shown in this position in Fig. 7.

If it be desired to operate the power unit to extract juice, the juice extracting device is applied to the top of the unit. A juice extracting device, arranged in accordance with this invention, and adapted to be operated with the power unit in its inverted position, is shown in Figs. 7 and 8. This juice extracting device comprises a bowl 73 which, as shown, is provided with a centrally arranged aperture 74. Attached to the bottom of the bowl is a plate 75 which supports a sleeve 76 in the central aperture. This plate also supports a depending stud 77 which is similar in shape to the upper end 34a of the supporting rod 34 provided for the beater element 11. This stud 77 is arranged to be received within the aperture 36 provided in the motor housing and to be locked to the housing by means of the latch 38 in the same manner that the beater element is attached to the housing. This secures the juice extracting bowl to the power unit. The juice extracting device further comprises a reamer 78 provided with a shaft 79 arranged to be directed through the sleeve 76 so that its lower end is received in driving engagement with the drive shaft 27. The bowl is provided with a depending spout 80 through which the extracted juice is delivered.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A household food mixing device comprising a standard, a combination motor, and beater operating unit removably mounted on said standard, whereby said beater can be operated while mounted on said standard, or as a portable device removed from said standard, a handle for said unit for supporting it when removed from said standard, a switch for said motor provided with a switch controlling member, means biasing said controlling member to its off position, and a latch for said controlling member arranged to hold it in its motor energizing position against the force of said biasing means when said unit is positioned on said standard, and positioned to be engaged and moved to a releasing position by the operator when said handle is grasped to support and operate said unit as a portable device.

2. A household food mixing device comprising a standard, a combination motor, and beater operating unit removably mounted on said standard, whereby said beater can be operated while mounted on said standard, or as a portable device removed from said standard, a handle for said unit for supporting it when removed from said standard, switching means for said motor provided with a switch controlling member manually movable to a motor energizing position, means holding said controlling member in said motor energizing position when said motor is moved to said position and said unit is on said standard, and means positioned to be engaged by the operator when said handle is grasped to support said unit as a portable device and operably associated with said control member to release it automatically when grasped so that said operator must manually hold said controlling member in said energizing position while supporting said unit.

3. A household food mixing device comprising a standard, a combination motor, and beater operating unit removably mounted on said standard, whereby said beater can be operated while mounted on said standard, or as a portable device removed from said standard, a handle attached to said unit for removing it from said standard and supporting it while removed, a switch in said handle arranged to control said motor to operate it at a plurality of speeds provided with a switch controlling member movable to a plurality of speed controlling positions corresponding to said speeds and accessible on the exterior of said handle for manual operation by the operator, a spring arranged to bias said controlling member to its off position, and a latch engaging said member to hold it in each of said controlling positions having an operating portion on the exterior of said handle positioned so that the grip of the operator on said handle in supporting said unit moves said latch to release automatically said switch controlling member, whereby when said motor and beater unit is used as a portable device, said operator must manually hold said controlling member in each of its speed controlling positions against the force of said spring.

4. A household food mixing device comprising a standard, a combination motor, and beater operating unit removably mounted on said standard whereby said beater can be operated while mounted on said standard, or as a portable device removed from said standard, said unit including a multi-speed electric motor, a gear reduction unit and a beater driven by said motor through said gear reduction unit, a handle attached to said unit for removing it from said standard and supporting it while removed, a switch in said handle arranged to control said motor to operate it at a plurality of speeds provided with a plurality of fixed contacts arranged at spaced intervals, a relatively elongated fixed contact opposite said plurality of contacts, a switch slide movably mounted between said elongated contact and said plurality of contacts carrying a bridging contact member arranged to successively connect said elongated contact with said plurality of contacts when said slide is moved from an off position to successive speed controlling positions, electrical connections controlled by said contacts to control the speed of said motor, an operating member attached to said slide accessible on the exterior of said handle for manual operation by the operator, a spring connected to said slide biasing it to its off position, and a spring latch member carried by said handle arranged to engage a plurality of projections on said slide resiliently to hold said slide in each of said speed controlling positions against the force of said spring, but permitting manual adjustment of said slide by its operating member, said latch member having an operating portion on the exterior of and below the handle positioned so that the grip of the operator on said handle in supporting said unit moves said latch upwardly out of the path of said projections to release automatically said slide, whereby when said motor and beater unit is used as a portable device, said operator must manually hold said slide in each of its speed controlling positions against the force of said spring.

5. A household food mixing device comprising a standard, a combination motor, and beater operating unit removably mounted on said standard, whereby said beater can be operated while mounted on said standard, or as a portable device removed from said standard, a handle for said unit for supporting it when removed from said standard, a switch for said motor provided with a switch controlling member slidably movable to a plurality of speed controlling positions, a spring biasing said controlling member to its off position, a plurality of spaced projections on said controlling member, and a resilient latch member having a latching portion supported to engage said projections to hold said controlling member in each of said speed controlling positions when said unit is supported on said standard, and an operating portion positioned so that the grip of the operator on said handle in supporting said unit moves said latch member to cause said latching portion to move out of the path of said projections so as to release said controlling member, whereby when said unit is used as a portable device, said operator must manually hold said controlling member in each of its speed controlling positions against the force of said spring.

6. A combination food mixing and juice extracting device comprising a motor driven power unit provided with an operating motor and a shaft driven by said motor, a standard, means for attaching said operating unit to said standard in each of two positions, in one of which it is adapted to drive a food beating element and in the other of which it is adapted to drive the juice extracting reamer of a juicer having a juice collecting bowl around the reamer, a latch carried by said power unit arranged to engage said beating element when said power unit is in said one position so as to secure it to said power unit in driving relation with said shaft, and to engage said bowl when said power unit is in said other position to hold the bowl to said unit.

7. A mixing device comprising a motor driven beater operating unit including a motor and a vertical shaft driven by said motor, a standard, means for attaching said operating unit to said standard, a beater unit arranged to be suspended from said operating unit having a beater element arranged to be driven by said shaft and a support for said beater element supporting the unit with said shaft in driving relation with said element, a latch carried by said operating unit arranged to engage said support so as to secure it to said operating unit, said attaching means for said operating unit being arranged to support said unit in a reverse position so as to operate an auxiliary device above it, said latter device being provided with a securing member engaged by said latch when said device is in its operative position above said unit.

8. A mixing device comprising a combination motor and beater unit, a standard for said unit, spaced channels on said unit, spaced flanges on said standard arranged to slidably receive said channels so as to support said unit on said standard in either an upright or an inverted position, a spring latch member mounted on said unit, a plurality of detents in at least one of said flanges spaced longitudinally thereof and arranged to receive said latch member to position and hold said unit on said standard in each of a plurality of upright positions and at least one detent in the other of said flanges arranged to receive said latch member to position and hold said unit on said standard in an inverted position.

WALTER VAN GUILDER.